United States Patent [19]
Osaki et al.

[11] 4,388,630

[45] Jun. 14, 1983

[54] INK LIQUID SUPPLY SYSTEM WHICH COMPENSATES FOR TEMPERATURE VARIATION

[75] Inventors: Mikio Osaki, Kashihara; Toshiaki Tabuchi; Yoichi Shimazawa, both of Nara, all of Japan

[73] Assignee: Sharp Kabushiki Kaisha, Osaka, Japan

[21] Appl. No.: 242,554

[22] Filed: Mar. 11, 1981

[30] Foreign Application Priority Data

Mar. 22, 1980 [JP] Japan ................................ 55-37699

[51] Int. Cl.[3] ............................................ G01D 15/18

[52] U.S. Cl. ................................ 346/140 R; 346/75

[58] Field of Search ................. 346/140 R, 140 IJ, 75, 346/140 PD; 417/292, 32

[56] References Cited

U.S. PATENT DOCUMENTS 3,787,882 1/1974 Fillmore et al. .................. 417/32 X
4,204,215 5/1980 Nakarai .......................... 346/140 IJ
4,263,602 4/1981 Matsumoto et al. ........... 346/140 IJ
4,270,133 5/1981 Shimazawa et al. ........... 346/140 IJ
4,278,984 7/1981 Matsumoto et al. ........... 346/140 IJ

*Primary Examiner*—G. Z. Rubinson
*Assistant Examiner*—W. Brady
*Attorney, Agent, or Firm*—Birch, Stewart, Kolasch & Birch

[57] ABSTRACT

An ink liquid supply system for an ink jet system printer includes a constant flow rate pump and a pressure accumulator for removing a pressure pulsation or ripple created by the constant flow rate pump. In order to stabilize the constant flow rate operation and to shorten the preparation period of the system when the system operation is started, a temperature compensation or sensitive system is provided for varying the ink liquid pressure within the pressure accumulator. The temperature compensation system includes a bimetal element for varying the pressure to be applied to a resilient member included in the pressure accumulator. The pressure adjusting operation is continuously conducted even when the ink jet system printer does not operate.

6 Claims, 5 Drawing Figures

INK LIQUID SUPPLY SYSTEM WHICH COMPENSATES FOR TEMPERATURE VARIATION

BACKGROUND AND SUMMARY OF THE INVENTION

The present invention relates to an ink liquid supply system in an ink jet system printer and, more particularly, to an ink liquid supply system for stabilizing the constant flow ink liquid supply.

A constant flow rate ink liquid supply system is highly required in an ink jet system printer of the charge amplitude controlling type to ensure accurate printing. To achieve the constant flow rate supply, it has been proposed to employ a constant flow rate pump. A typical construction of the constant flow rate pump and the related ink liquid supply system is disclosed in copending application U.S. Ser. No. 097,389, now U.S. Pat. No. 4,263,602 CONSTANT FLOW RATE LIQUID SUPPLY PUMP, filed on Nov. 26, 1979 by Masafumi Matsumoto and Matahira Kotani, and assigned to the same assignee as the present application. The corresponding German case was published on June 4, 1980 (DOS 2,948,131).

In such a constant flow rate ink liquid supply system, a pressure accumulator is provided for eliminating a pressure pulsation or a ripple created by the constant flow rate pump. The flow rate stabilization is not properly conducted in the above-mentioned constant flow rate ink liquid supply system when the ambience temperature greatly changes. Further, the above-mentioned constant flow rate ink liquid supply system requires a considerably long period to reach the constant flow rate operation after the system operation is initiated. A great variation in the temperature affects the size of the printed character in an ink jet system printer employing the above-mentioned constant flow rate ink liquid supply system. More specifically, when the printing operation is started at a considerably low temperature and the ambience temperature becomes high while the printing operation is conducted, the character size becomes gradually larger. This is not desirable in an ink jet system printer.

Accordingly, an object of the present invention is to provide a constant flow rate ink liquid supply system which ensures the constant flow rate ink liquid supply even when the ambience temperature greatly changes.

Another object of the present invention is to provide a constant flow rate ink liquid supply system which reaches a normal constant flow rate supply condition in a short period after initiation of the system operation.

Still another object of the present invention is to provide a constant flow rate ink liquid supply system, wherein the ink liquid pressure is varied in response to the variation in ambience temperature.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, the pressure applied to a pressure accumulator is varied depending on the variation of the ambience temperature. In a preferred form, a bimetal temperature detection element (pressure adjusting depressing member) is located above a pressure applying (depression) rod of a pressure accumulator for varying the pressure applied to the ink within the pressure accumulator in a fashion continuously depending on the ambience temperature.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
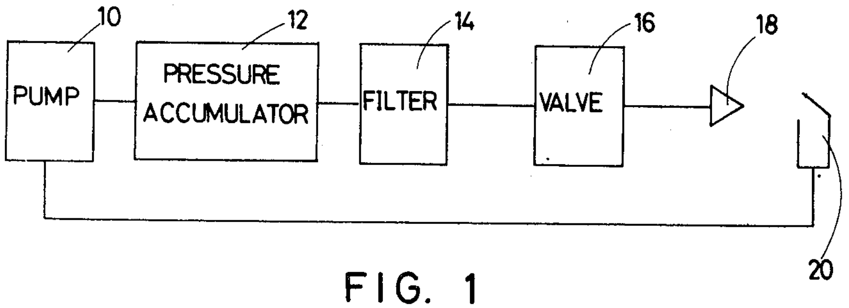
FIG. 1 is a schematic block diagram of an ink liquid supply system employing a pressure accumulator.

FIG. 1 schematically shows an ink liquid supply system for an ink jet system printer. The ink liquid supply system comprises a constant flow rate pump 10, a pressure accumulator 12 for removing a pressure pulsation or a ripple created by the constant flow rate pump 10, a filter 14, and an electromagnetic valve 16 for controlling the ink liquid supply direction. The ink liquid of the constant flow rate is applied to an ink droplet issuance unit 18 including a nozzle, an electromechanical transducer for vibrating the nozzle at a predetermined frequency, and a charging tunnel for applying a preselected charge to an ink droplet in accordance with print information. The charged ink droplet is deflected while it travels through a constant high voltage field established by a pair of deflection electrodes in accordance with a charge amount carried thereon and reaches a recording paper as is well known in the art of the ink jet system printer of the charge amplitude controlling type. Ink droplets not contributing to the actual printing operation are not charged by the charging tunnel and are directed to a beam gutter 20 for recirculation purposes. In such a system, the pressure accumulator 12 is very important to stabilize the constant flow rate operation.

Detailed constructions of the above-mentioned ink liquid supply system and the ink droplet issuance unit are described in the above-mentioned copending application U.S. Ser. No. 097,389, CONSTANT FLOW RATE LIQUID SUPPLY PUMP, now U.S. Pat. No. 4,263,602 filed on Nov. 26, 1979 by Masafumi Matsumoto and Matahira Kotani, and assigned to the same assignee as the present application.

In the normal operation at the room temperature (25° C.), the constant flow rate pump 10 is placed in a condition, wherein 1 cc/second ink liquid is emitted from the ink droplet issuance unit 18 while 3 kg/cm$^2$ pressure is maintained at the pressure accumulator 12. In a considerably low temperature condition, the ink viscosity becomes high and, therefore, the pressure maintained at the pressure accumulator 12 must be higher than 3 kg/cm$^2$ in order to hold the constant flow rate of 1 cc/second. Likewise, in a considerably high temperature condition, the pressure maintained at the pressure accumulator 12 must be lower than 3 kg/cm$^2$.

In the conventional system disclosed in the copending application Ser. No. 097,389 now U.S. Pat. No. 4,263,602, the rapid and great change of the ambience temperature can not be followed by the pressure accumulator. Further, the preparation period for the conventional system is considerably long because there is the possibility that the temperature when the system operation is started will be greatly different from the temperature at which the last system operation has been terminated.

The present invention is to minimize the above-mentioned defects. In summary, the present invention is to adjust the pressure in the pressure accumulator 12 in a fashion depending on the ambience temperature.

Figure 2:
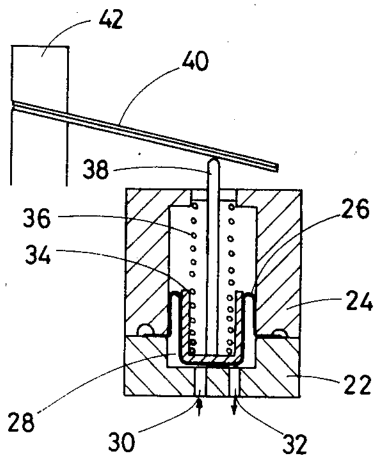
FIG. 2 is a sectional view of an embodiment of a temperature compensation system of the present invention.

FIG. 2 shows an embodiment of a temperature compensation system of the present invention. The pressure accumulator 12 is located between the constant flow rate pump 10 and the filter 14 as clearly disclosed in FIG. 1. FIG. 2 shows the pressure accumulator 12 in detail which has a similar construction as the pressure accumulator disclosed in the copending application Ser. No. 097,389 now U.S. Pat. No. 4,263,602. The pressure accumulator 12 comprises a base block 22 and a cover block 24. A resilient member 26, such as a bellows or a diaphragm, is supported between the base block 22 and the cover block 24, thereby determining a pressure chamber 28. The base block 22 is provided with an inlet opening 30 for introducing the ink liquid from the constant flow rate pump 10 into the pressure chamber 28, and an outlet opening 32 for developing the ink liquid toward the filter 14.

A cap 34 is secured to the resilient member 26. A spring 36 is disposed between the cap 34 and the ceiling of the cover block 24 to depress the resilient member 26 downward via the cap 34. A depression rod 38 is fixed to the cap 34, the free end of the depression rod 38 projecting through the ceiling of the cover block 24. A pressure adjusting depressing member 40 is secured to a supporting wall 42. The pressure adjusting depressing member 40 is constructed to make contact with the free end of the depression rod 38. The pressure adjusting depressing member 40 is made of bimetal so that the depression force changes depending on the ambience temperature. Accordingly, the pressure in the pressure chamber 28 is determined by the balanced force of the spring 36 and the pressure adjusting depressing member 40 (bimetal).

Figure 3:
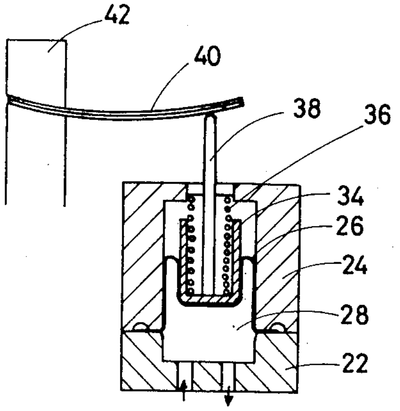
FIG. 3 is a sectional view for explaining an operation mode of the temperature compensation system of FIG. 2.

FIG. 3 shows an operation mode of the combined pressure accumulator and the temperature compensating pressure adjusting system of the present invention. The pressure adjusting depressing member 40 (bimetal) bends upward as the ambience temperature becomes high. That is, the pressure adjusting depressing member 40 functions to vary the pressure to be applied to the ink liquid in a fashion depending on the variation of the ambience temperature, thereby maintaining the ink liquid flow constant without regard to the temperature variation.

In the conventional system such as disclosed in the copending application Ser. No. 097,389, the pressure in the pressure accumulator is held at a constant condition when the system operation is interrupted. That is, the pressure in the pressure accumulator is never adjusted even when the ambience temperature changes while the ink jet system printer does not operate. Thus, the conventional system requires a long period preparation time. However, in accordance with the present invention, the pressure in the pressure accumulator is adjusted in response to variations of the ambience temperature even when the ink jet system printer does not operate.

Figure 4:
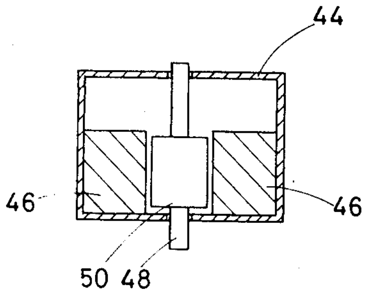
FIG. 4 is a sectional view of an essential part of another embodiment of a temperature compensation system of the present invention.

FIG. 4 shows an essential part of another embodiment of the pressure compensation temperature sensitive system of the present invention. A ferromagnetic casing 44 is disposed above the depression rod 38 (see FIG. 2). Magnets 46 are disposed in the ferromagnetic casing 44. A shaft 48 is slidably supported by the ferromagnetic casing 44, and a temperature sensitive element 50 is secured to the shaft 48. The temperature compensation sensitive 50 is movable in the place surrounded by the magnets 46. The ferromagnetic casing 44, the magnets 46 and the temperature sensitive element 50 form, in combination, a magnetic circuit. The lower end of the shaft 48 is fixed to the free end of the depression rod 38. The temperature compensation element 50 is made of a Curie temperature responsive ferrite so that the magnetic permeability of the temperature compensation element 50 varies in response to the variations of the ambience temperature.

Figure 5:
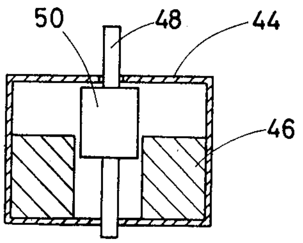
FIG. 5 is a sectional view for explaining an operation mode of the temperature compensation system of FIG. 4.

FIG. 5 shows an operation mode of the temperature compensation system of FIG. 4, wherein the spring force of the spring 36 and the attraction force of the magnets 46 applied to the temperature compensation element 50 are balanced with each other. Under these conditions, when the ambience temperature becomes high, the attraction force created by the magnets 46 becomes small due to the variation of the magnetic permeability of the temperature compensation element 50. When the ambience temperature becomes low, the attraction force becomes large. Accordingly, the pressure determined in the pressure accumulator chamber 28 (see FIG. 2) varies in response to the variations of the ambience temperature.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink supply system for an ink jet printer including a pump means, a pressure accumulator for removing a pressure pulsation created by said pump means and a pressure compensation temperature-sensitive means for varying the pressure within said pressure accumulator in response to variations of ambient temperature even when the main power supply to the system is interrupted, placing the system in a non-operative condition.

2. The ink liquid supply system of claim 1, wherein said pressure compensation temperature-sensitive means comprises a magnetic circuit.

3. An ink supply system for an ink jet printer comprising:

a pump means;

a pressure accumulator for removing a pressure pulsation created by said pump means, said pressure accumulator comprising:

a housing;

a resilient member disposed in said housing for forming a pressure chamber within said housing;

an inlet opening formed in said housing for introducing ink liquid derived from said pump means into said pressure chamber;

an outlet opening formed in said housing for directing the ink liquid from said pressure chamber to an ink droplet issuance unit of said ink jet printer; and a spring means for regulating said resilient member within said pressure chamber in response to movement from said temperature-sensitive means caused by variations in ambient temperature; and a pressure compensation temperature-sensitive means for varying the pressure within said pressure accumulator in response to variations of ambient temperature.

4. The ink liquid supply system of claim 3, wherein said pressure compensation temperature-sensitive means comprises a bimetal element disposed above said pressure accumulator and a support means for supporting said bimetal element such that a free end of said bimetal element is free to move upward or downward when the ambient temperature of the system changes, said accumulator further including a depression rod disposed between said free end of said bimetal element and said resilient member within said pressure chamber which shifts the location of said resilient member within said housing in response to said upward and downward movement of said free end of said bimetal element, varying the pressure in said pressure chamber depending on the variations of the ambient temperature.

5. The ink liquid supply system of claim 4, wherein said resilient member comprises a diaphragm, and said accumulator further comprises a cap secured to said diaphragm such that said spring means and said depression rod regulate said diaphragm via said cap.

6. An ink supply system for an ink jet printer comprising:

a pump means;

a pressure accumulator for removing a pressure pulsation created by said pump means; and a pressure compensation temperature-sensitive means for varying the pressure within said pressure accumulator in response to variations of ambient temperature even during periods when the main power supply to the system is interrupted creating an inoperative condition, said pressure compensation temperature-sensitive means comprising:

a bimetal element disposed above said pressure accumulator and a support means for supporting said bimetal element such that a free end of said bimetal element is free to move upward or downward when the ambient temperature of the system changes, said accumulator further including a depression rod disposed between said free end of said bimetal element and said resilient member within said pressure chamber which shifts the location of said resilient member within said housing in response to said upward and downward movement of said free end of said bimetal element, varying the pressure in said pressure chamber depending on the variations of the ambient temperature.

* * * * *